Sept. 4, 1928.

H. D. GEYER

STEERING WHEEL

Filed April 12, 1926

Inventor
Harvey D. Geyer
By Spencer, Sewall & Hardman
his Attorneys

Sept. 4, 1928.
H. D. GEYER
STEERING WHEEL
Filed April 12, 1926    2 Sheets-Sheet 2
1,683,344
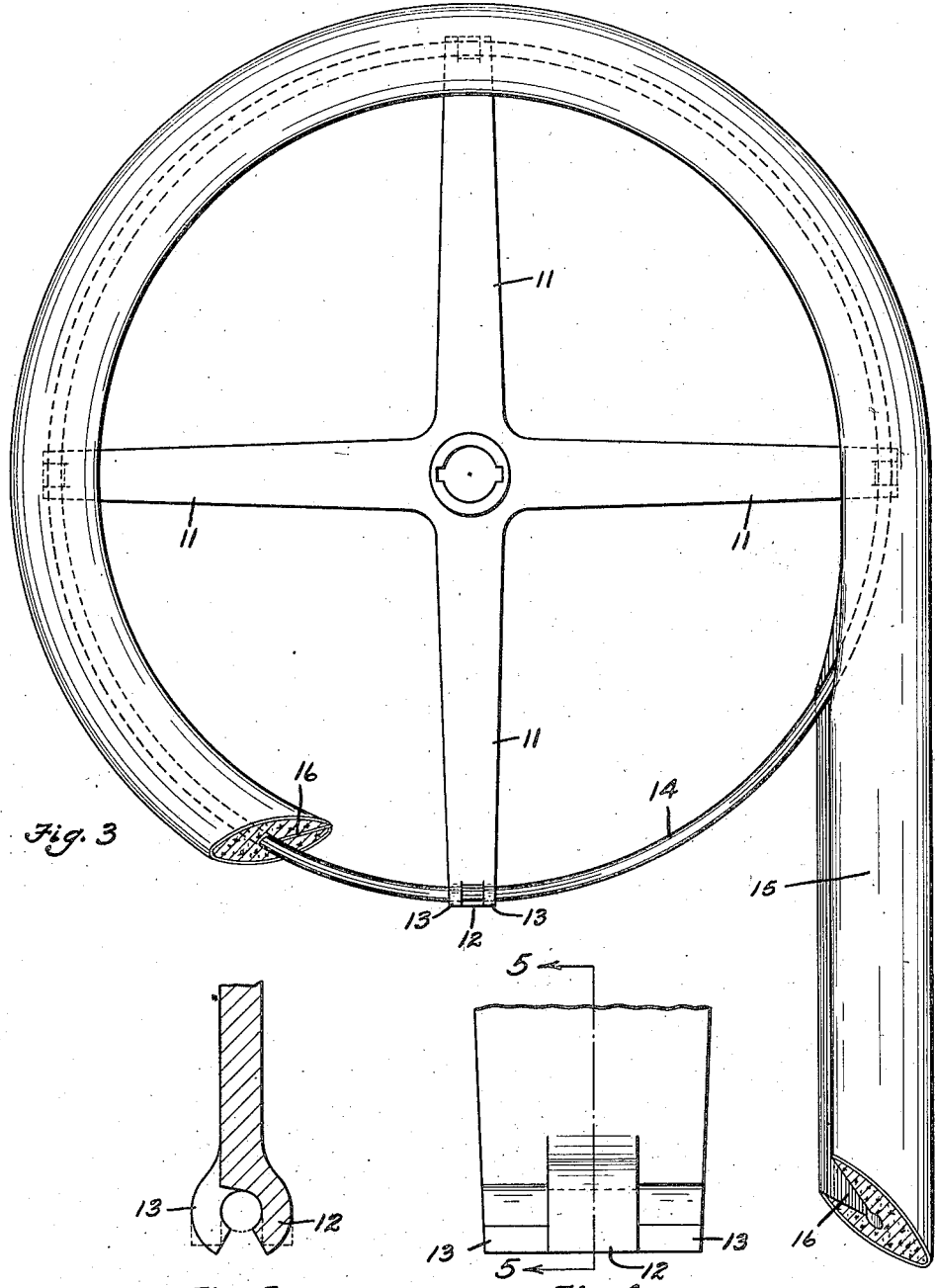

Patented Sept. 4, 1928.

1,683,344

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

STEERING WHEEL.

Application filed April 12, 1926. Serial No. 101,341.

This invention relates to improvements in composition rim handwheels, especially such as are used as steering wheels on automotive vehicles.

An object of this invention is to provide a steering wheel having great strength under shock by providing a resilient reinforcing element in the mold rim material.

Another object is to provide a molded rim steering wheel having the rim so fixed to the ends of the spider arms that it is impossible to break the rim entirely free from the end of the spider arm in case of a crash. Heretofore molded rim steering wheels have been considered to greatly increase the danger to a driver in event of a crash. In such an event the driver's body is thrown violently forward against the steering wheel and if the rim can be broken from the spider arms by such a blow there is great danger that the metal spoke projecting toward the driver will pierce his body and cause a fatal accident. With the wheel of this invention, however, the resilient hoop is so fixed to the ends of the spider arms that, even though the molded rim be severely bent or broken in a crash, the hoop will remain fixed to the ends of the spider arms and thus prevent any possibility of the relatively sharp spider arms piercing the driver's body.

Further objects and advantages of the present invention will be apparent from the following description, reference being had to the accompanying drawings, wherein a preferred form of embodiment of the present invention is clearly shown.

In the drawings:

Fig. 3 is a view illustrating the method of applying the unvulcanized rubber rim to the reinforcing hoop after said hoop has been fixed to the ends of the spider arms.

Fig. 4 is a detail view on a magnified scale of the outer end of a spider arm.

Fig. 5 is a section on line 5—5 of Fig. 4, and shows in dotted lines the position of the malleable lugs before they are clinched around the reinforcing hoop.

Figure 1:
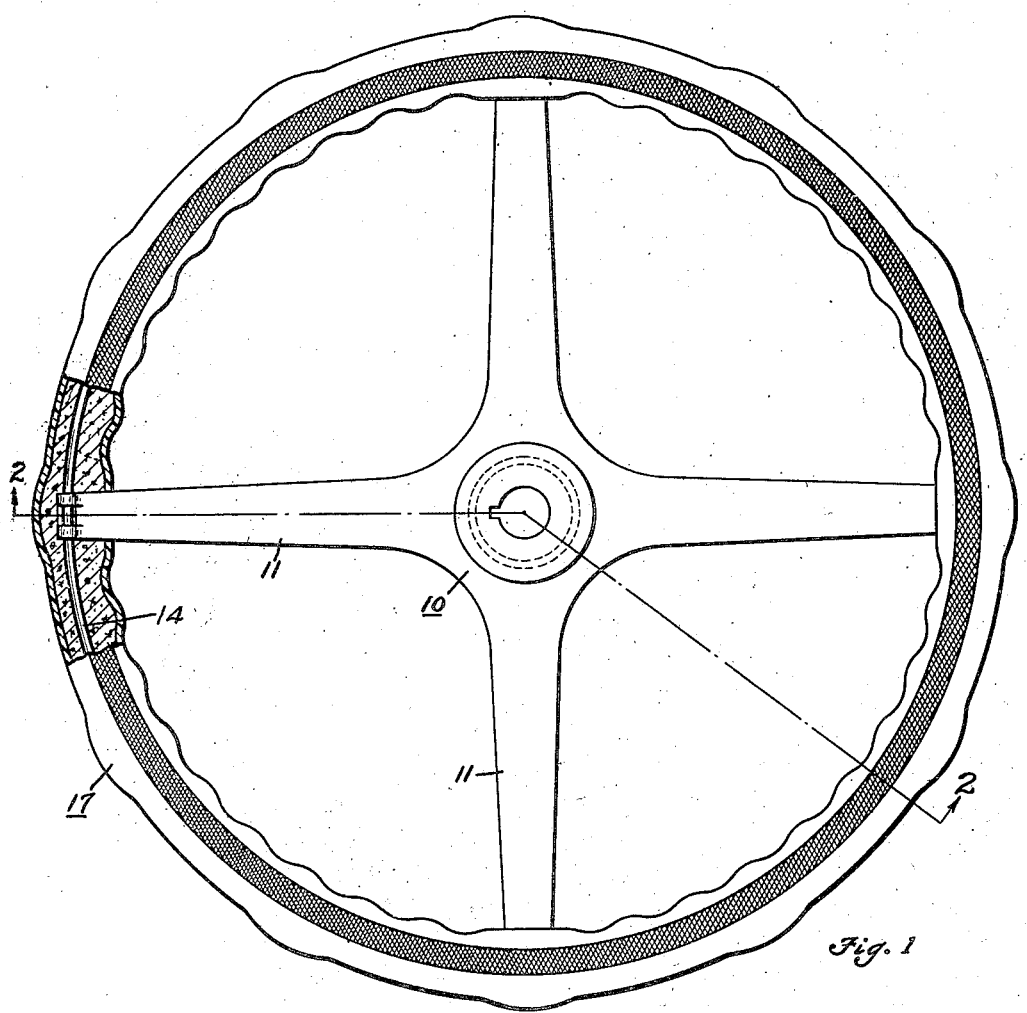
Fig. 1 is a plan view of an automobile steering wheel built according to this invention. The cut-away portion shows the reinforcing steel hoop secured to the end of the spider arm.

Numeral 10 designates the metal spider which may be an intergral casting, as shown, or any suitable design of built-up spider such as is well known in the art. In the particular form chosen for illustration of this invention the spider is cast of metal which is sufficiently malleable to permit the lugs 12 and 13 on the outer end of each arm 11 to be clinched around the reinforcing hoop 14, as clearly shown in Figs. 4 and 5. These lugs 12 and 13 are preferably staggered, as clearly shown in Fig. 4, so that the two side lugs 13 lie on the sides of rather than directly opposite to the central lug 12. This avoids the necessity of providing a core between the lugs 12 and 13 when casting the spider, and hence the spider may be more economically produced in a permanent mold or die-casting machine.

The reinforcing hoop 14 is preferably made from $\frac{3}{16}$ inch steel wire having its ends welded together, whereby a quite rigid self-sustaining ring is formed which nevertheless yields sufficiently to absorb severe shocks without danger of breaking. This hoop 14 may be easily distorted sufficiently to place it between the lugs 12 and 13 on the spider arms, after which these lugs are clinched around it as clearly shown in full lines in Fig. 5.

Figure 2:
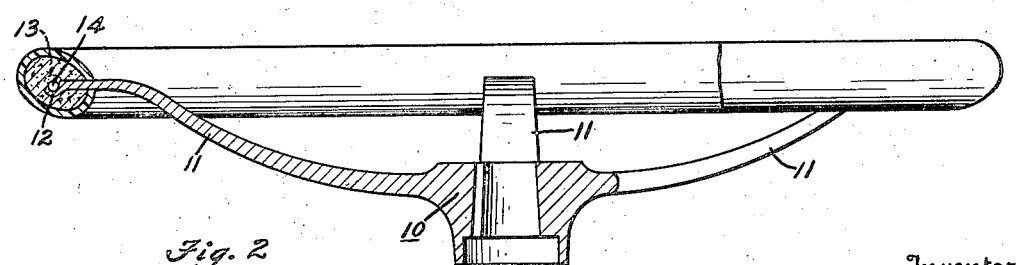
Fig. 2 is a vertical section on line 2—2 of Fig. 1.

The reinforcing hoop 14 having been thus secured to the ends of the spider arms 11, a length of unvulcanized rubber stock 15 having a continuous slit 16 cut therein to a substantial depth is now laid around the hoop 14, as clearly shown in Fig. 3. The hoop 14 is received within the slit 16 and the plastic rubber rim 15 pressed firmly around the hoop so that it adheres thereto and is thus held firmly in place in ring form until the spider and rim is placed in a suitable vulcanizing mold. The ends of the rim stock 15 are preferably cut at a bias, as shown, and the ends abutted and pressed firmly together so that a perfect joint is made during vulcanization. The wheel unit is then placed in a suitable curing mold and the rubber vulcanized at a suitable temperature and for the required length of time. During vulcanization the edges of slit 16 are vulcanized together to form an integral rim structure 17 and the rubber flows up tightly against the inserted ends of the arms 11 and is vulcanized thereto. The finished wheel is illustrated in Figs. 1 and 2.

The resilient wire hoop 14 greatly increases the shock-resisting quality of the molded rim 17 and prevents the rim material from being easily broken under any kind of a blow. The wire hoop 14 is so secured by the lugs 12 and 13 to the ends of the arms 11 that there is no possibility of the rim being broken entirely loose from the arm ends in case of a severe crash. Hence this wheel possesses the safety feature pointed out hereinabove.

While the form of embodiment of the present invention as herein disclosed, constitutes a preferred form, it is to be understood that other forms might be adopted, all coming within the scope of the claim which follows.

What is claimed is as follows:

A steering wheel for automotive vehicles, comprising: a molded rubber rim having a reinforcing endless metal hoop possessing resilient qualities molded in place therein, and a metal spider having arms, the outer ends of said arms being recessed and secured directly to said hoop whereby said arms are prevented from piercing the body of the driver in case of a crash.

In testimony whereof I hereto affix my signature.

HARVEY D. GEYER.